(12) United States Patent  (10) Patent No.: US 7,528,563 B2
Thoreux et al.  (45) Date of Patent: May 5, 2009

(54) METHOD OF CONTROLLING A SEAT

(75) Inventors: Loïc Thoreux, Courbevoie (FR);
Laurent Nivet, Asnieres (FR)

(73) Assignee: Precilec (FR)

( * ) Notice: Subject to any disclaimer, the term of this patent is extended or adjusted under 35 U.S.C. 154(b) by 184 days.

(21) Appl. No.: 11/741,588

(22) Filed: Apr. 27, 2007

(65) Prior Publication Data
US 2007/0284923 A1 Dec. 13, 2007

(30) Foreign Application Priority Data
Apr. 27, 2006 (FR) .................................. 06 03795

(51) Int. Cl.
*H02P 1/04* (2006.01)
(52) U.S. Cl. ....................... 318/466; 318/264; 318/266; 318/468; 297/344.11; 297/344.17; 297/378.13
(58) Field of Classification Search ......... 318/264–266, 318/286, 466–469; 297/331, 344.11, 344.13, 297/344.17, 378.13; 296/65.01, 65.13, 65.17
See application file for complete search history.

(56) References Cited

U.S. PATENT DOCUMENTS

| 5,164,645 A | | 11/1992 | Furuse et al. | |
| 5,605,368 A | * | 2/1997 | Noma et al. | ................... 296/64 |
| 5,765,916 A | | 6/1998 | Patel | |
| 6,240,352 B1 | * | 5/2001 | McCurdy | ..................... 701/45 |
| 6,406,092 B1 | * | 6/2002 | Cordes et al. | .......... 297/216.16 |
| 6,583,596 B2 | | 6/2003 | Nivet et al. | |
| 6,595,587 B2 | * | 7/2003 | Konishi et al. | ............... 297/331 |
| 6,736,461 B2 | * | 5/2004 | Blair et al. | ............. 297/378.12 |
| 6,943,516 B2 | | 9/2005 | Woller et al. | |
| 7,083,214 B2 | * | 8/2006 | Hayakawa et al. | ........ 296/65.12 |
| 7,410,217 B2 | * | 8/2008 | Inoue et al. | ............. 297/378.13 |

FOREIGN PATENT DOCUMENTS

DE  43 37 293  12/1994

OTHER PUBLICATIONS

Search Report, Jan. 15, 2007.

* cited by examiner

*Primary Examiner*—Bentsu Ro
*Assistant Examiner*—Thai Dinh
(74) *Attorney, Agent, or Firm*—Kening Li

(57) ABSTRACT

A method for controlling a seat which is equipped with:
  at least one controllable actuator (20) for moving two portions (16, 18) of the seat relative to each other;
  a controllable lock (26) for positive mechanical locking of the movement of the two portions of the seat, the lock (26) being able to be displaced between an engaged position opposite a complementary stop (30) and a disengaged position remote from the stop (30), which method comprises, in the event of an order for modification of a command for the actuator (20), steps for:
verifying whether the two portions (16, 18) are in a critical range (I) of relative positioning, and
as long as the two portions (16, 18) are in the critical range (I), applying to the actuator (20) a command which is different from the modified command.

7 Claims, 2 Drawing Sheets

METHOD OF CONTROLLING A SEAT

TECHNICAL FIELD

The present invention relates to a method for controlling a seat which is equipped with:

at least one controllable actuator for moving two portions of the seat relative to each other;

a controllable lock for positive mechanical locking of the movement of the two portions of the seat, the lock being able to be displaced between an engaged position opposite a complementary stop and a disengaged position remote from the stop.

The invention further relates to a seat which is suitable for implementation of this method.

BACKGROUND TO THE INVENTION

Passenger seats provided in aircraft are generally equipped with electrical actuators which allow different movable elements of the seat to be displaced relative to each other.

In order to ensure the safety of passengers during the critical phases of take-off or landing, it is imperative for the seat to be able to have an adequate level of rigidity, which prevents the seat from becoming deformed or becoming disengaged from the remainder of the aircraft in the event of a significant impact. The presence of only the actuators which connect the different elements of the seat is not always sufficient to meet these requirements for strength in the event of an impact.

Therefore, it is known to immobilize specific portions of the seat relative to each other using locks during critical phases of the flight of the aircraft. These locks are constituted, for example, by the movable core of an electromagnet whose winding is carried by a movable portion of the seat and whose movable core can be moved between a retracted position and an extended position, wherein the lock can be engaged in the fixed portion of the seat, thus providing positive mechanical locking of the movement of the two portions of the seat relative to each other.

In arrangements of this type, the movable core of the electromagnet which forms the lock is received in a small catch which is provided in a corresponding portion of the seat.

For the control thereof, the seat is provided with means for controlling the electromagnet so that, before the activation of the actuator which ensures the movement of the two portions relative to each other, the lock is retracted and, conversely, so that the extension of the lock is brought about when the actuator reaches a predetermined position in which the lock is in the catch in order to ensure the activation of the lock.

In practice, it has been found that, taking into account production tolerances of the seat and the actuators, and involuntary movements of the passenger in the seat which may occur, the movement of the lock to the retracted position thereof and/or to the extended position thereof is made difficult, even impossible, owing to the misalignment between the lock and the catch.

In the case of locking, the movement force of the electromagnet, which is relatively small, is often insufficient to disengage or position the lock.

SUMMARY OF THE INVENTION

The object of the invention is to provide a solution to this problem of movement of the lock.

To this end, the invention relates to a method for controlling a seat of the above-mentioned type, characterized in that it comprises, in the event of an order for modification of a first command for the actuator, the steps of:

verifying whether the two portions are within a predetermined critical range of relative positioning, and as long as the two portions are in the critical range, applying to the actuator a command which is different from the modified command.

According to specific embodiments, the method comprises one or more of the following features:

the modified command is an order for interruption of the movement of the actuator and the different command applied is the continuation of the movement;

the modified command is the movement of the actuator in one direction, with the lock initially locked, and the different command applied is the movement of the actuator in the opposite direction; and the critical range overlaps one end of the stop.

The invention also relates to a vehicle seat comprising:

at least two portions which can be moved relative to each other, at least one controllable actuator for moving the two portions of the seat relative to each other;

a controllable lock for positive mechanical locking of the movement of the two portions of the seat, the lock being able to be displaced between an engaged position opposite a complementary stop and a disengaged position away from the stop, a control device, characterized in that, in the event of an order for modification of a first command for the actuator, the control device comprises means for:

verifying whether the two portions are in a critical range of relative positioning, and as long as the two portions are in the critical range, applying to the actuator a different command which is different from the modified command.

BRIEF DESCRIPTION OF THE DRAWINGS

The invention will be better understood from a reading of the following description, given purely by way of example and with reference to the drawings, in which.

DESCRIPTION OF PREFERRED EMBODIMENTS

Figure 1:
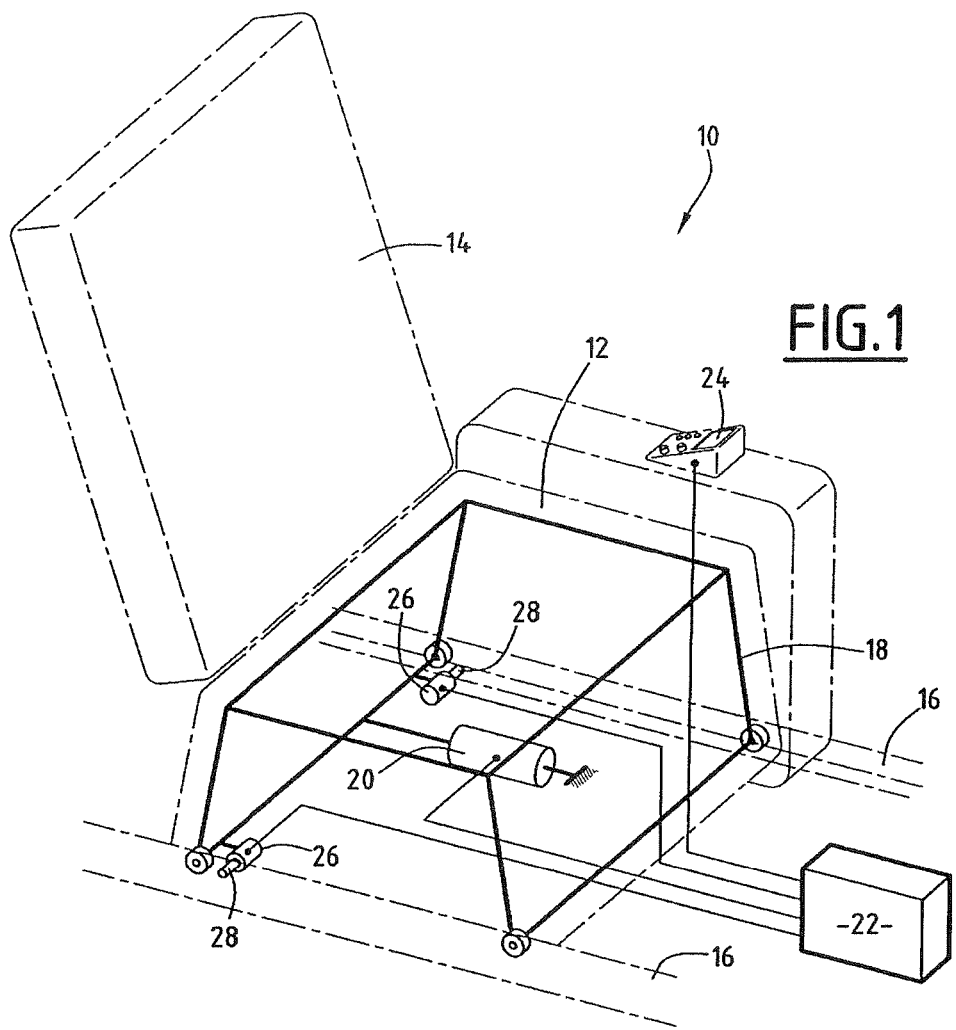
FIG. 1 is a schematic perspective view of a vehicle seat according to the invention.

The seat 10 illustrated in FIG. 1 comprises a seat member 12, a backrest 14 and two rails 16 which are fixed to the floor and along which the seat member 12 and the backrest 14 are mounted so as to be able to slide by means of an underframe 18. The rails 16 form means for guiding the underframe 18 of the seat.

An actuator 20 is arranged between the underframe 18 and the floor in order to ensure the movement of the underframe 18 along the length of the rails 16. The actuator 20 is connected to a central control unit 22 which is in turn connected to a keypad 24 which allows the passenger sitting in the seat to move the seat by controlling the actuator 20.

As known to those ordinarily skilled in the art, the actuator 20 is provided with means for measuring its position and therefore the position of the seat along the length of the rails 16. This measuring means is formed, for example, by a potentiometer. It is connected to the control unit 22 in order to have continuous knowledge of the current position of the seat.

Furthermore, two locks 26 are mounted on the underframe 18. Each of the two locks comprises the electromagnet core 27, and a winding 28 which is fixedly joined to the underframe. The core 26 can be moved transversely relative to the direction of movement of the underframe between a retracted, or disengaged position in which it is remote or away from the associated rail 16 and an extended position in which it is engaged in a catch 30 which forms a stop and which is provided in the rail 16, thus providing positive mechanical locking of the movement of the underframe 18 relative to the rails 16.

Figure 2:
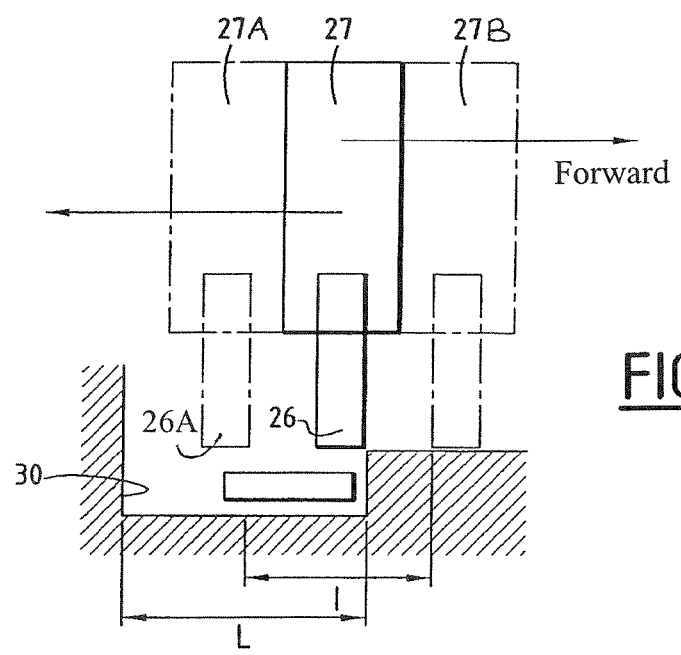
FIG. 2 is a schematic view of the arrangement of the lock and the catch.

The catch 30 and the lock 26 are illustrated schematically on a larger scale in FIG. 2. In this manner, the catch 30 has a dimension L in the movement direction of the underframe which is greater than the corresponding dimension of the lock 26.

In this manner, the lock 26 in the extended position thereof can be engaged in the catch 30 for a plurality of positions of the underframe over a small movement range thereof in which the lock is opposite the catch 30. A first position of the electromagnet 27 is illustrated with solid lines in FIG. 2 whilst another position 27A is illustrated with dot-dash lines in order to illustrate this situation.

The electromagnets 27 are each connected to the control unit 22 in order to control the extension of the cores 26 when the seat is in a safety position in which the locks must be engaged in the catch and in order to retract the cores 26 when the user controls the movement of the seat from this safety position to another position, in particular by controlling the actuator 20.

Figure 3:
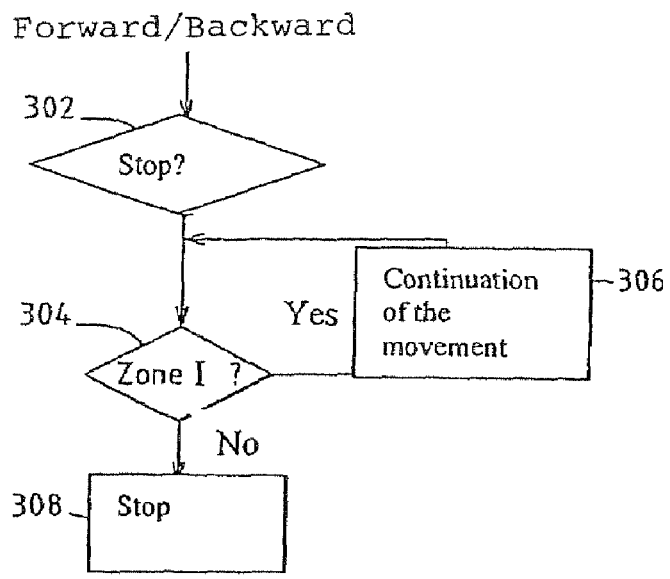
FIGS. 3 and 4 are algorithms which illustrate the operating phases of the seat using a method according to the invention.
Figure 4:
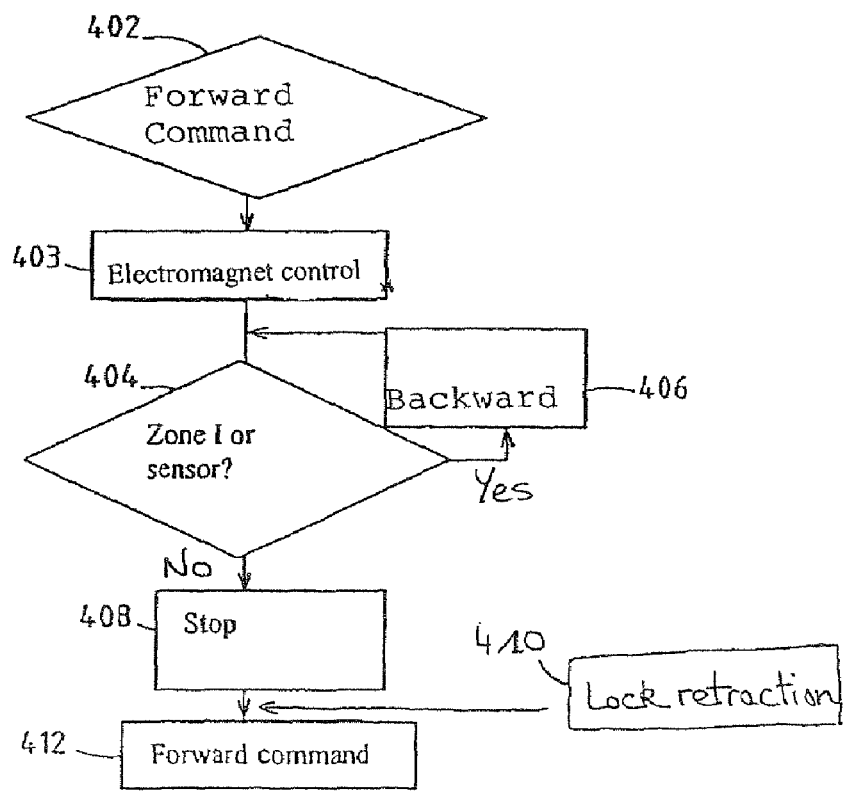

To this end, the central control unit 22 uses the algorithms which are illustrated in FIGS. 3 and 4. In order to implement these algorithms, a zone I which partially overlaps a front end of the catch 30 is defined in the control unit 22 in order to control the seat in a specific manner when the lock 26 is in this zone at least in order to move the lock towards the disengaged position thereof. The position provided by the measuring means provided in the actuator is permanently compared with zone I.

During a phase for moving the underframe 18 by moving the actuator 20, whether it involves a forward movement or a backward movement, the lock 26 is retracted. During this operating phase, and as illustrated in FIG. 3, it is detected, at step 302, whether a stop command is issued by the user. A command of this type may involve, for example, the user no longer pressing the control button which allows the movement of the underframe 18.

When a stop command of this type is detected, the actuator 20 is not immediately stopped and step 304 is implemented. During this step, the position of the actuator 20 and therefore the underframe 18 is determined in order to know whether or not the lock 26 is in the zone I.

If lock 26 is in the zone I, the movement of the underframe 18 is continued at step 306, the actuator 20 still being controlled by the unit 22 in spite of the stop command of the user.

When the lock has left zone I, stopping of the actuator is brought about at step 308.

In this manner, by implementing the algorithm of FIG. 3, the lock 26 cannot stop opposite the zone I of the catch. Thus, if the lock must be extended, for example, because the seat is in its safety position, the lock is engaged in the catch whilst being certain that it is outside the zone I. The lock 26 is thus sufficiently remote from the edges of the catch so that it can be readily engaged in the catch, with no risk of it striking the edges thereof.

In this position, the extension of the lock is controlled automatically by the unit 22 as known to those ordinarily skilled in the art.

If, before the stop command, the seat moves in an advance or forward direction, whilst the lock enters the zone I, the advance of the seat is continued until the lock is outside the zone I, so that it is no longer opposite the catch, as illustrated by the electromagnet 27B with dotted lines in FIG. 2. In this manner and in spite of production tolerances, the central control unit 22 detects that the underframe is not in a safety position and does not activate the command for extension of the locks 26.

FIG. 4 illustrates the algorithm used when the seat leaves the safety position thereof, the locks 26 being initially extended from the catches.

As soon as an advance command is detected at step 402, the electromagnet is directly controlled at step 403; it is verified, at step 404, whether or not the lock 26 is in zone I. If lock 26 is in zone 1, the actuator 20 is controlled, at step 406, in the opposite direction in order to bring about the backward movement of the underframe. The backward movement command is continued until the lock leaves the zone I and is in the position 26A illustrated with dot-dash lines in FIG. 2. Stopping of the actuator 20 is controlled at step 408. At step 410, the locks 26 are retracted and, only after retraction of the locks, the actuator is commanded to move forward, in accordance with the request of the user.

In this manner, using such methods, the lock is extended or retracted from the catch when it is remote from the ends of the catch. It can thus be displaced in spite of the low power of the electromagnet acting on the movable core. Furthermore, a sensor can allow the retraction of the lock to be controlled. If this sensor confirms the retraction of the lock, the 406 is void or stops.

In a variant, the catch 30 formed by a hole in which the lock 26 is arranged is replaced with a rod which forms a stop for a lock in the form of a hook, the hook being able to be moved between a position in which the hook is engaged around the rod and a position disengaged from the rod.

The invention claimed is:

1. A method for controlling a seat which is equipped with:
   at least one controllable actuator for moving two portions of the seat relative to each other;
   a controllable lock for positive mechanical locking of the movement of the two portions of the seat, the lock being able to be displaced between an engaged position opposite a complementary stop and a disengaged position remote from the stop,
   wherein the method comprises, in the event of a modified command is issued for the actuator, the steps of:
   verifying whether the two portions are in a predefined critical range of relative positioning,
   as long as the two portions are in the predefined critical range, applying to the actuator a different command which differs from the modified command, and
   moving the lock to an engaged position thereof or to the disengaged position thereof when the lock has left the critical range.

2. The method according to claim 1, wherein the modified command is an order for interruption of the movement of the actuator and the different command applied is the continuation of the movement.

3. The method according to claim 1, wherein: (1) the modified command is a movement of the actuator in one direction, with the lock initially locked, and (2) the different command applied is the movement of the actuator in the opposite direction.

4. The method according to claim 1, wherein the critical range overlaps one end of the stop.

5. A seat comprising:
    at least two portions which can be moved relative to each other,
    at least one controllable actuator for moving the two portions of the seat relative to each other;
    a controllable lock for positive mechanical locking of the movement of the two portions of the seat, the lock being able to be displaced between an engaged position opposite a complementary stop and a disengaged position remote from the stop,
    a control device,
    wherein, in the event of an order of a modified command is issued for the actuator, the control device comprises means for:
    verifying whether the two portions are in a predetermined critical range of relative positioning,
    as long as the two portions are in the critical range, applying to the actuator a different command which differs from the modified command, and
    moving the lock to an engaged position or to a disengaged position thereof when the lock has left the critical range.

6. A method for controlling a seat,
    wherein the seat comprises (1) at least one controllable actuator for moving two portions of the seat relative to each other, and (2) a controllable lock for positive mechanical locking of the movement of the two portions, the lock being able to be displaced between an engaged position opposite a complementary stop and a disengaged position remote from the stop, and
    wherein the seat may be in a safety position wherein the lock is engaged, or in a second position wherein the lock is disengaged,
    the method comprising the steps of:
    (a) verifying whether the two portions are in a predetermined critical range of relative positioning, and
    (b) in the event while the seat is moving backward or forward and the lock is in a disengaged position, an order is received to stop the seat movement, (i) continuing the movement of the seat in its original direction if the two positions are in the predetermined critical range; (ii) stopping the seat movement as soon as the two positions are outside the predetermined critical range, and (iii) optionally engaging the lock if the seat reaches the safety position; or
    (c) in the event while the seat is in the safety position and the lock is engaged, an order is received to move the seat forward, (i) moving the seat backward if the two positions are in the predetermined critical range; (ii) retracting the lock to the disengaged position as soon as the two seat portions are outside the predetermined critical range, and (iii) moving the seat forward as soon as the lock is retracted; or
    (d) in the event while the seat is in the forward most position and the lock is disengaged, an order is received to move the seat backward, (i) moving the seat backward; and (ii) optionally engaging the lock to the engaged position only when the two positions are outside the predetermined critical range.

7. A seat comprising (1) at least two seat portions which can be moved relative to each other (2) at least one controllable actuator for moving the two portions of the seat relative to each other; (3) a controllable lock for positive mechanical locking of the movement of the two portions of the seat, the lock being able to be displaced between an engaged position opposite a complementary stop and a disengaged position remote from the stop, and (4) a control device which comprises means for effecting seat control according to claim 6.

* * * * *